(12) United States Patent
Song et al.

(10) Patent No.: US 7,679,853 B2
(45) Date of Patent: Mar. 16, 2010

(54) DETECTION OF SIGNAL DISTURBANCE IN A PARTIAL RESPONSE CHANNEL

(75) Inventors: Hongwei Song, Longmont, CO (US); Weijun Tan, Longmont, CO (US)

(73) Assignee: Agere Systems Inc., Allentown, PA (US)

( * ) Notice: Subject to any disclaimer, the term of this patent is extended or adjusted under 35 U.S.C. 154(b) by 1024 days.

(21) Appl. No.: 11/319,319

(22) Filed: Dec. 28, 2005

(65) Prior Publication Data

US 2007/0146917 A1    Jun. 28, 2007

(51) Int. Cl.
*G11B 5/02*    (2006.01)

(52) U.S. Cl. .............................. 360/59; 360/31; 360/39; 360/53

(58) Field of Classification Search .................... None
See application file for complete search history.

(56) References Cited

U.S. PATENT DOCUMENTS

| | | | | |
|---|---|---|---|---|
| 5,233,482 A * | 8/1993 | Galbraith et al. | ............... | 360/46 |
| 5,751,510 A * | 5/1998 | Smith et al. | .................... | 360/67 |
| 6,009,549 A * | 12/1999 | Bliss et al. | .................. | 714/769 |
| 6,049,763 A * | 4/2000 | Christiansen et al. | ....... | 702/133 |
| 6,101,054 A * | 8/2000 | Tsunoda | ..................... | 360/46 |
| 6,104,557 A * | 8/2000 | Kasai et al. | ................... | 360/46 |
| 6,148,431 A | 11/2000 | Lee et al. | ..................... | 714/794 |
| 6,219,192 B1 * | 4/2001 | Gopalaswamy et al. | ....... | 360/25 |
| 6,414,806 B1 * | 7/2002 | Gowda et al. | ................. | 360/25 |
| 6,446,236 B1 * | 9/2002 | McEwen et al. | ............ | 714/795 |
| 6,513,141 B1 | 1/2003 | Livingston | .................. | 714/792 |
| 6,603,722 B1 * | 8/2003 | Taguchi et al. | ........... | 369/59.21 |
| 6,633,615 B1 | 10/2003 | Pekarich et al. | ............. | 375/265 |
| 6,668,349 B1 * | 12/2003 | Sawaguchi | ................... | 714/755 |
| 6,691,263 B2 | 2/2004 | Vasic et al. | ................. | 714/709 |
| 6,724,550 B2 * | 4/2004 | Lim et al. | ...................... | 360/25 |
| 6,724,555 B2 * | 4/2004 | Ohta | ........................... | 360/65 |
| 6,728,928 B2 * | 4/2004 | Jeon et al. | ................... | 714/795 |
| 6,920,001 B2 * | 7/2005 | Chua et al. | .................... | 360/25 |

(Continued)

OTHER PUBLICATIONS

"CMOS Circuits for Thermal Asperity Detection and Recover in Disk-Drive Read Channels," by A. Lee et al.; IEEE International Midwest Symp. On Circuits and Systems, Tulsa, pp. III-364 to III-367, Aug. 2002.

(Continued)

*Primary Examiner*—Dismery E Mercedes
(74) *Attorney, Agent, or Firm*—Mendelsohn, Drucker & Associates, P.C.; Edward J. Meisarosh; Steve Mendelsohn

(57) ABSTRACT

In one embodiment, irregular electronic disturbance signals in a partial-response read channel are detected by a disturbance detector using state metrics generated by maximum-likelihood sequence detector. For example, a thermal asperity (TA) detector detects the occurrence of TAs in the read channel of perpendicularly recorded magnetic media by using the state metrics generated by a Viterbi detector. Changes in state metrics (e.g., magnitudes of the branch metrics of the trellis diagram) used by the Viterbi detector are tracked. If the magnitude of the rise of the path metric increases above a set threshold, then a TA is detected. Alternatively, or additionally, the rate of change of the magnitude of the path metrics is tracked. If the rate of change within a set time window is above a specified threshold, then a TA is detected.

20 Claims, 4 Drawing Sheets

U.S. PATENT DOCUMENTS

| | | | | |
|---|---|---|---|---|
| 7,173,783 | B1* | 2/2007 | McEwen et al. | 360/46 |
| 7,185,269 | B2* | 2/2007 | Mar et al. | 714/795 |
| 7,286,311 | B1* | 10/2007 | Oberg et al. | 360/25 |
| 7,315,427 | B1* | 1/2008 | Wu | 360/39 |
| 7,440,208 | B1* | 10/2008 | McEwen et al. | 360/39 |
| 7,522,678 | B2* | 4/2009 | Ashley et al. | 375/341 |
| 2002/0085298 | A1* | 7/2002 | Sobey | 360/25 |
| 2003/0043487 | A1* | 3/2003 | Morita et al. | 360/25 |

OTHER PUBLICATIONS

"Vive Viterbi," by Rob Howald, Mar. 1, 2002, [retrieved on Sep. 13, 2005], retrieved from the Internet <URL: http:/www.comsdesign.com/showarticle.jhtml?articleID=16504215>, 3 pages.

"Final Project Proposal: The Viterbi Algorithm as a Stream Application," by John Davis et al., EE482C Advanced Computer Organization: Stream Processor Architectures, Stanford University, Spring 2002, [retrieved on Sep. 13, 2005], retrieved from the Internet <URL: http://cva.stanford.edu/ee482s/projects/group2_proposal.pdf>, 3 pages.

"High-Speed CMOS Analog Viterbi Detector for 4-PAM Partial Response Signalling," by Bahram Zand et al., $27^{th}$ European Solid-State Circuits Conference in Villach, Austria, Sep. 18-20, 2001, [retrieved on Sep. 13, 2005], retrieved from the Internet <URL: http:www.imec.be/esscirc/esscirc2001/Proceedings/data/12.pdf>, 4 pages.

"Low-SNR Viterbi With Added Noise Detection Channel," by Gordon F. Hughes, Paper EC-05, 2002 Intermag Conference, Center for Magnetic Recording Research, Univ. of Calif., San Diego, La Jolla, CA, [retrieved on Sep. 13, 2005], retrieved from the Internet <URL: http://cmrr.ucsd.edu/Hughes/NoiseChanWeb.pdf>, 5 pages.

"Partial Response and Viterbi Detection Channel Simulator for Digital Magnetic Recording," by Stefan Stancescu et al., Studies in Informatics and Control, vol. 9, No. 3, Jun. 2000, [retrieved on Sep. 7, 2005], retrieved from the Internet <URL: http:/www.ici.ro/ici/revista/sic2000_3/art06.html>, 6 pages.

"Crafting a Custom Viterbi Decoder for WLAN Designs," by Sharad Singhal et al., Jan. 31, 2002, [retrieved on Nov. 4, 2005], retrieved from the Internet <URL: http://www.commsdesign.com/showArticle.jhtml?articleID=16504015>, 8 pages.

\* cited by examiner

300

DETECTION OF SIGNAL DISTURBANCE IN A PARTIAL RESPONSE CHANNEL

BACKGROUND OF THE INVENTION

1. Field of the Invention

The present invention relates in general to the detection of signal disturbances, and, in particular, to the detection, in partial response read channels, of signal disturbances such as those caused by thermal asperities.

2. Description of the Related Art

Data transmission systems are susceptible to noise from various sources. One such source of noise is a thermal asperity (TA), which can occur in the reading of data from magnetically recorded media, such as hard disk drives. A thermal asperity occurs when a magneto-resistive (MR) read head, which typically flies at a high speed and low height or distance over the surface of the hard disk drive platter, collides with a particle on the surface of the platter, with a bump or similar imperfection on the platter, or with the platter itself. The collision causes a spike in the temperature of the magneto-resistive read head, which therefore temporarily increases the resistance of the read element in the magneto-resistive read head, which in turn can cause erroneous data readings for the period corresponding to the temperature spike. The amplitude of a typical TA can exceed the value of a normal read signal by a factor of more than 10. Unless appropriately handled, a TA can substantially degrade system performance during its occurrence. Read errors due to a TA can last for several hundred bits, or longer.

FIG. 1 shows a typical thermal asperity disturbance, labeled as "Raw TA," which shows a signal with a rapid rise and a slow decay. Some basic techniques known in the art to combat TAs include analog TA recovery, channel detection, coding, and Reed-Solomon erasure decoding, each of which involves the detection of a TA followed by an attempt to correct for the detected TA by adjusting some aspect of the processing of the signal corresponding to the duration of the TA.

For example, temporarily shortening the time constant $\tau$ of an AC coupler (ACC) in a read channel detector can substantially shorten the period of the TA, as can be seen in FIG. 1 by comparing the curve labeled "Raw TA" with the curve labeled "TA after ACC." However, the TA must first be detected before corrective measures can be taken.

FIG. 2 shows a typical prior-art read channel detector 200 for detecting and correcting for TAs. TA detector 200 operates based on the difference in frequency between a TA and the normal read-back signal. A TA is a low-frequency disturbance, while normal read-back signals are high frequency. Therefore, one method to detect a TA is to use a low-pass filter. Since the high-frequency normal read-back signal is filtered out, the TA signal that remains can be detected by thresholding the amplitude of the surviving signal.

In particular, as shown in FIG. 2, signal 201a from the read head goes into pre-amplifier 201. The output of the pre-amplifier during a typical TA is shown in FIG. 1 as "TA after pre-amp." Output 202a of the pre-amplifier goes into AC coupler (ACC) 202. An AC coupler, as is well known in the art, acts as a high-pass filter. ACC 202 has a variable time constant $\tau$. Output 203a of the ACC goes into variable gain amplifier (VGA) 203, which smoothes the signal amplitude. Output 204a of VGA 203 forms an input for three elements of prior-art read-channel detector 200. Output 204a goes into continuous time filter 204, which is part of the normal signal-processing path not associated with the detection of TAs. Output 204a also goes into low-pass filter 205. Output 206a of low-pass filter 205 is compared by comparator 206 with a specified threshold value 206b to detect the rising edge of a TA. If comparator 206 determines that output value 206a of low-pass filter 205 is greater than threshold value 206b, then output 207b of comparator 206 indicates this to control logic 207, which generates control signal 202b to reduce the time constant $\tau$ of ACC 202, and thus changing the frequencies filtered by ACC 202. FIG. 1 shows output 203a of the ACC during a typical TA, after its time constant $\tau$ has been reduced, as "TA after ACC."

Zero-crossing detector 208 detects the transition of the value of output 204a from positive to negative, as exemplified in the curve "TA after ACC" in FIG. 1, and thus confirms the occurrence of a TA. Output 207a of zero-crossing detector 208 goes into control logic 207. Based on inputs 207a and 207b, control logic 207 determines whether a TA has occurred, and, if so, outputs a signal 207c indicating that a TA has occurred. After the control logic has determined that the TA has passed, the time constant $\tau$ of ACC 202 is returned to its normal value. Thermal asperities and the prior-art method for their detection and correction are further described in "CMOS Circuits for Thermal Asperity Detection and Recovery in Disk-Drive Read Channels," by A. Lee et al., *IEEE International Midwest Symp. on Circuits and Systems*, Tulsa, pp. III-364 to III-367, August 2002, incorporated herein by reference.

The prior-art systems for detecting TAs are effective for relatively large TAs, with amplitudes of about two or more times the amplitudes of normal read-back signals. However, the prior-art systems do not reliably detect TAs of relatively small amplitudes, such as those of about the same amplitude as the amplitude of a normal read-back signal. Such relatively small TAs are more common in perpendicularly recorded magnetic media than in longitudinally recorded magnetic media. Furthermore, relatively small TAs typically are not problematic in longitudinally recorded magnetic media because the read channels of such media use DC-free partial-response targets and the relatively small TAs can be effectively eliminated by the inherent equalization.

Perpendicularly recorded magnetic media allow for greater recording densities and their use is likely to overtake that of the easier-to-implement longitudinally recorded magnetic media. However, in perpendicular-recording read channels, DC-full or DC-partial targets are used, and small TAs cannot be effectively eliminated by equalization and therefore may cause long burst errors.

In addition, baseline wander, which can be caused by high-pass filtering of the low-frequency signals abundant in perpendicular recording, makes detection of relatively small TAs difficult. Furthermore, if the threshold for TA detection, as shown in FIG. 2 as signal 206b, is set too low, then frequent mis-detection of TAs (i.e., declaring something to be a TA which is not a TA) can occur. On the other hand, if the threshold is not low enough, then some small TAs will go uncorrected. In other words, it is difficult to differentiate a small TA from baseline wander. If small TAs are undetected and not handled appropriately, then the resultant error propagation in the read channel would be problematic for iterative decoding systems in next-generation devices.

SUMMARY OF THE INVENTION

In one embodiment, the present invention is a method and apparatus for detecting electrical signal disturbances in a digital read channel. According to this embodiment, a disturbance detector (1) receives values of a state metric from a sequence detector that receives a signal of the digital read channel and (2) evaluates changes in the state metric values to determine whether an electrical signal disturbance occurred in the digital read channel.

BRIEF DESCRIPTION OF THE DRAWINGS

Other aspects, features, and advantages of the present invention will become more fully apparent from the following detailed description, the appended claims, and the accompanying drawings in which like reference numerals identify similar or identical elements.

DETAILED DESCRIPTION

What is needed is a system to detect the presence of small TAs, or similar disturbances, and also, where appropriate, a system to detect their location, for example, within a disk sector. Such a system can use a probabilistic detector typically employed in partial-response read channels, such as a maximum likelihood sequence detector, which typically relies on a Viterbi algorithm. The operation of Viterbi detectors is well known in the art, as described in, e.g., Howald, R., "Vive Viterbi!" Mar. 1, 2002 [retrieved on Sep. 13, 2005], retrieved from the Internet <URL: http://www.commsdesign.com/showarticle.jhtml?articleID=16504215>, and U.S. Pat. No. 6,633,615 B1, Oct. 14, 2003, issued to Pekarich et al., both of which are incorporated herein by reference.

In certain embodiments, the present invention provides a system and/or method for detecting TAs and similar electrical disturbances, and is particularly useful for the detection of relatively small TAs. The detection of TAs is accomplished through the use of a maximum-likelihood sequence detector (MLSD), such as a Viterbi detector, which can be modeled with a trellis diagram, and which is already present in a partial-response read channel. Thus, implementing the present invention in hardware does not require significant additional components, size, or power, since most of the resources needed, except for several comparators and counters, are already present in the MLSD. The present invention can also be used to detect other disturbances with characteristics similar to those of a TA.

In one embodiment, the present invention is a system and/or method that tracks the magnitudes of changes in the path metrics of the trellis channel. Normally, the noise encountered in a partial-response read channel is additive noise such as media noise and electronic noise. This noise can typically be modeled as additive Gaussian white noise (AGWN), and therefore as one moves along the trellis channel, the path metrics normally increase in approximately regular intervals. When a TA occurs, however, the noise is no longer only Gaussian white noise, and this causes the magnitudes of the branch metrics, and therefore the magnitudes of the increases in the path metrics, to increase at greater-than-normal rates for the duration of the TA. By tracking the magnitudes of the branch metrics or of the increases in the path metrics, and comparing to a threshold value, the system can detect the occurrence of a TA.

In a second embodiment, the present invention is a system and/or method that tracks the rates of change of the state metrics within set windows. Normally, the rate of change is relatively constant. During a TA or similar electrical disturbance, the rate of change of the state metrics increases significantly. By setting an appropriate threshold value for the rate of change values, a TA can be detected, and, if appropriate, its location within a sector of a disk drive can be determined.

Figure 3:
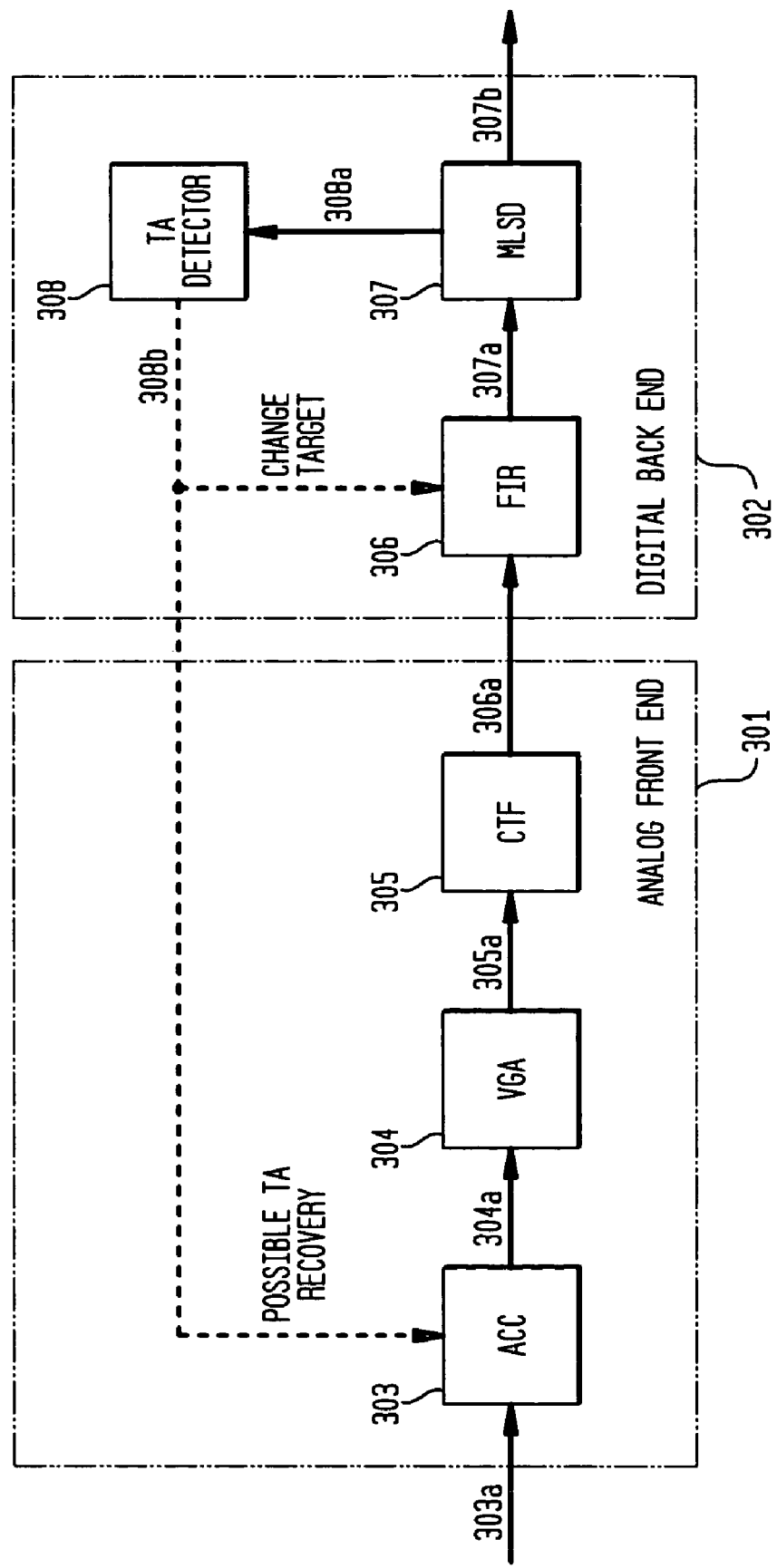
FIG. 3 is a block diagram showing an embodiment of the present invention.

FIG. 3 shows a read channel decoder 300, according to one embodiment of the present invention. This embodiment of the present invention uses a maximum-likelihood sequence detector (MLSD), such as a Viterbi detector. Hard disk drive read channels, which are partial-response channels, use a Viterbi detector, or similar MLSD, to decode the data read. Decoder 300 has an analog front end 301 comprising AC coupler (ACC) 303, variable gain amplifier (VGA) 304, and continuous time filter (CTF) 305. Read channel decoder 300 also has a digital back end 302 comprising finite impulse response (FIR) filter 306, maximum-likelihood sequence detector (MLSD) 307, and TA detector 308. Elements 303, 304, 305, 306, and 307 are part of the main signal processing path for a typical MLSD system. MLSD 307 is often implemented using a Viterbi algorithm (VA) detector.

FIG. 3 shows read channel decoder 300 (e.g., a partial-response channel decoder) with signal 303a going into ACC 303. The ACC outputs signal 304a, which goes into VGA 304, which outputs signal 305a to CTF 305. ACC 303, VGA 304, and CTF 305 are analogous to corresponding elements shown in FIG. 2. CTF 305 outputs signal 306a into FIR filter 306. FIR filter 306 outputs signal 307a to MLSD 307, which outputs signal 308a to TA detector 308, and signal 307b for normal data processing. Once a TA is detected by TA detector 308, it outputs a TA-detected signal 308b, which can be used, for example, to modify the target of FIR filter 306, or to effect a faster recovery from the TA by modifying the time constant τ of ACC 303, as discussed previously with regard to FIGS. 1 and 2

Signal 307a output by FIR filter 306 goes into MLSD 307 and has a target expressed as $f=[f_0, f_1, \ldots, f_L]$, where L is the duration of channel memory. Let the bit recorded on the partial-response read channel be represented by $x_k$, where k represents an instance of time. Read-back signal 307a is represented by $r_k$, where $r=f(\overline{x})x+n$, where $x=[x_k, x_{k-1}, \ldots x_{k-L}]$, and $n=[n_k, n_{k-1}, \ldots n_{k-L}]$, where n is additive noise, including both media noise and electronic noise, and $\overline{x}$ denotes a vector convolution.

Regardless of the noise, the channel can be described by a trellis diagram, whose branches can be denoted by $$s_{k-1} \xrightarrow{x_k/y_k} s_k,$$

where $x_k$ is the branch input and $y_k$ is the noiseless output, and where $s_{k-1}, s_k \in \{S_0, S_1, \ldots, S_{2^L-1}\}$ are the starting and ending states of the branch. Taking the noise into consideration, the branch metric $\gamma_k(s_{k-1}, s_k)$ is defined as:

$$\gamma_k(s_{k-1}, s_k) = \left[r_k - \left(x_k + \sum_{i=1}^{L} f_i x_{k-i}\right)\right]^2, \quad (1)$$

The path metric $M_k$ of $s_k$, calculated from the Viterbi algorithm (VA) trellis branches terminating at $s_k$, is:

$$M_k(s_k) = \min_{s_{k-1}} \{M_{k-1}(s_{k-1}) + \gamma_k(s_{k-1}, s_k)\} \quad (2)$$

The VA detector finds the maximum likelihood (ML) path with minimum path metric $M_k(S_0)$ at the end of a sector, i.e., where k=N, and where N is the length of the sector. If the correct ML path is selected and the data signal is removed, then all that remains in the path and branch metrics is the additive noise. Thus, the branch metric becomes:

$$\gamma_k(s_{k-1}, s_k) = n_k^2, \quad (3)$$

and the path metric becomes:

$$M_k(s_k) = \sum_{i=1}^{k} n_i^2. \quad (4)$$

Figure 1:
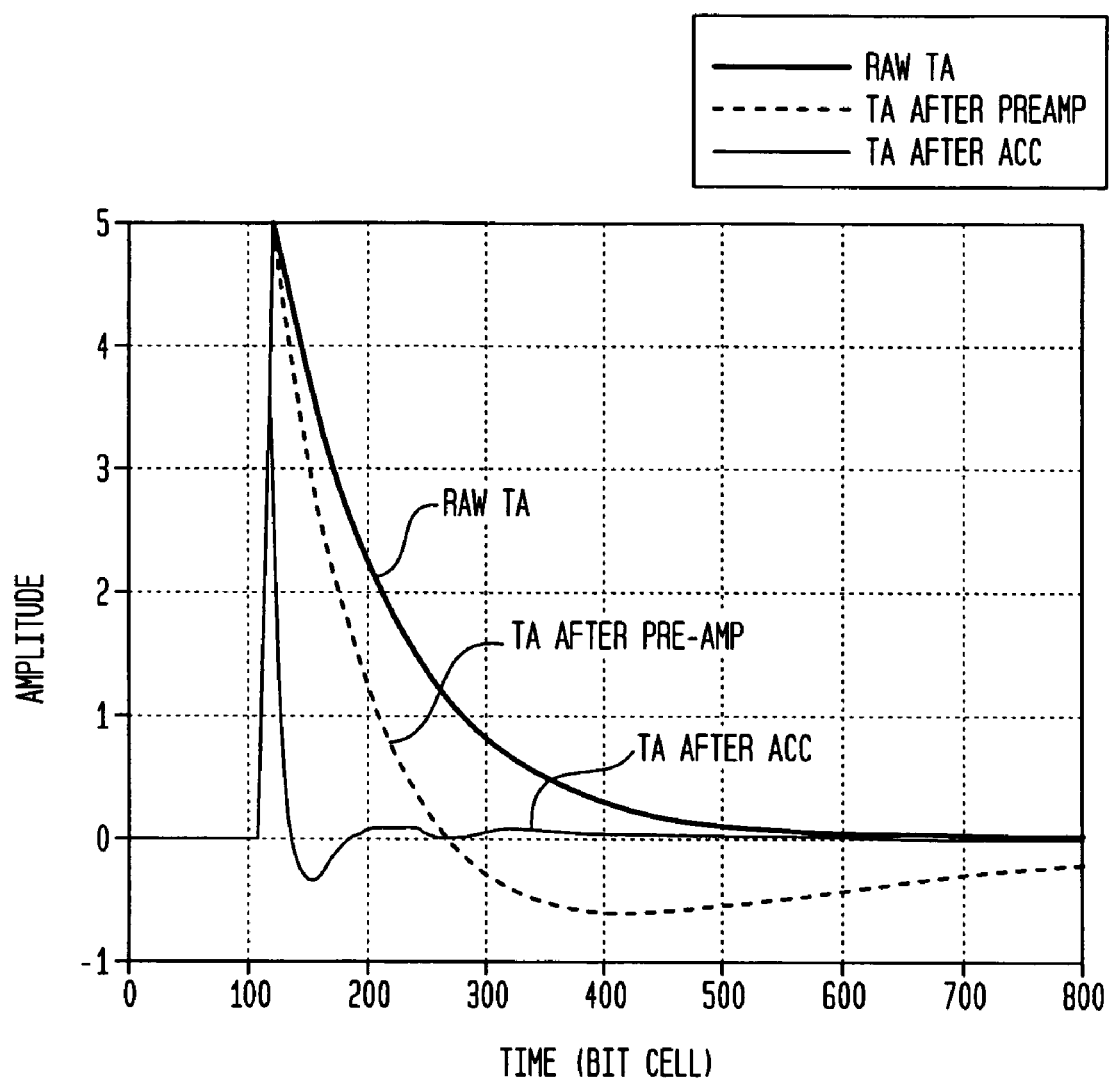
FIG. 1 shows simulated curve traces for a typical thermal asperity (TA) signal, the signal after processing by a pre-amplifier, and the signal after processing by an AC coupler after reduction of its time constant τ.
Figure 2:
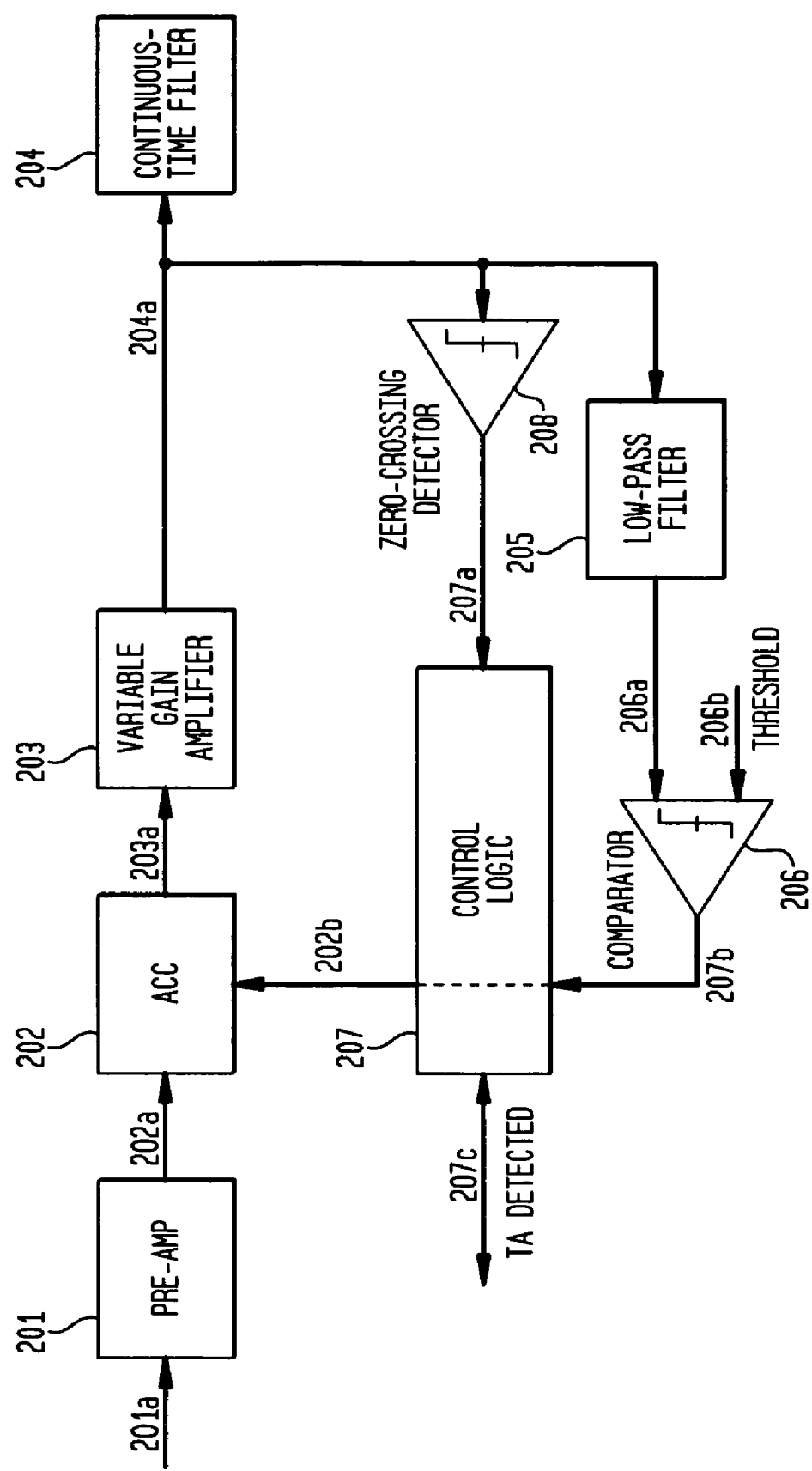
FIG. 2 is a block diagram showing a prior-art system for detecting TAs.

Normally, the path metric increases gradually, since the noise $n_k$ is zero-mean and Gaussian distributed. However, when a TA occurs, an additive disturbance $w_k$, which can be represented by a curve such as the curve labeled "Raw TA" in FIG. 1, is added to the read-back signal $r_k$. Thus, the branch metric during the duration of the TA becomes:

$$\gamma_k(s_{k-1}, s_k) = \left[r_k + w_k - \left(x_k + \sum_{i=1}^{L} f_i x_{k-i}\right)\right]^2, \quad (5)$$

It can be seen from Equations (3) and (5) that, when a TA occurs, the path metric increases at a greater-than-normal rate.

Consequently, the increase of the path metric $M_N(S_0)$ at the end of a sector, which is the accumulation of the branch metrics $\gamma_k(s_{k-1}, s_k)$ along the ML path, is relatively large. By setting an appropriate threshold on the path metric $M_N(S_0)$, a TA can be detected by TA detector 308. In other words:

$$\text{TA flag}=1 \text{ if } M_N(S_0) > M_{th} \quad (6)$$

where $M_{th}$ is the path metric threshold.

Figure 4:
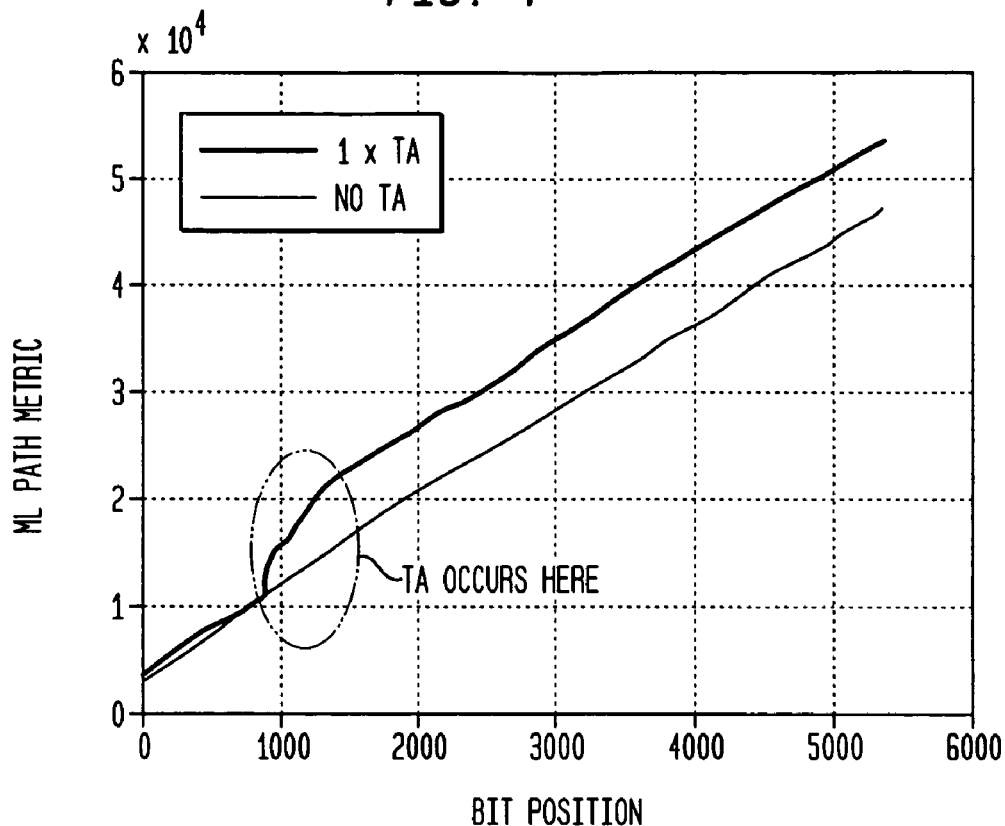
FIG. 4 shows simulated curve traces for path metrics versus bit position for (i) 1x TA, and (ii) no TA.

FIG. 4 shows a simulated curve trace of the path metrics $M_k(S_0)$ along the ML path for (i) a 1x TA, and (ii) no TA. The 1x TA curve shows a distinct rapid rise upon the occurrence of a TA. In larger TAs, the rise is even more pronounced. This increase can be used to detect both relatively large and relatively small TAs and similar disturbances.

In some embodiments, the signal-to-noise ratio (SNR) of the partial-response read channel remains fairly stable. This is so because, as the SNR declines, the likelihood that noise will be mis-detected as a TA increases, since, if the SNR gets too low, then the sector path metric can exceed the threshold value, i.e., $M_N(S_0) > M_{th}$, at normal signal values, thus providing false-positive detections of TAs. In such situations, the second embodiment of the present invention, described below, can be used.

In a second embodiment of the present invention, the rate of increase of the magnitudes of the branch metrics is tracked and used to detect the occurrence of a TA. It can be observed from Equations (3) and (5) that the branch metric $\gamma_k(s_{k-1}, s_k)$ of the ML path jumps up during a TA. In other words, the rate of increase of the branch metric $\gamma_k(s_{k-1}, s_k)$ is much larger than that for normal read-back signals. To avoid the effects of noise, the second embodiment uses a time window of length G (e.g., 6 or 10), and tracks the rate of increase between window instances, where the rate $R_k$ is represented by:

$$R_k = M_{(k+G)}(s_{(k+G)}) - M_k(s_k) \quad (7)$$

Thus, based on Equation (4), the rate for normal read-back signals is:

$$R_k = \sum_{i=k+1}^{k+G} n_i^2. \quad (8)$$

Assuming that $n_k$ is a random variable with a normal distribution $N(0, \sigma^2)$, $R_k$ is a chi-square random variable with a mean of $G\sigma^2$ and a variance of $2G\sigma^4$. On the other hand, where a TA occurs:

$$R_k = \sum_{i=k+1}^{k+G} \left[r_k + w_k - \left(x_k + \sum_{i=1}^{L} f_i x_{k-i}\right)\right]^2, \quad (9)$$

whose value is larger than $R_k$ in Equation (8). Thus, TA detector 308 detects a TA if $R_k$ is consecutively larger than a threshold rate, $R_{th}$, i.e.:

$$\text{TA flag}=1 \text{ if } R_k > R_{th} \text{ for } k=t, t+1, \ldots, t+d, \quad (10)$$

where t is the beginning position of the TA, d+1 is the length of the TA, and t+d is the ending position of the TA.

In an alternative embodiment, the rule expressed in Equation (10) can be relaxed so that a TA is considered detected if $R_k > R_{th}$ for a specified proportion of consecutive $R_k$ bits within a window, e.g., any 4 or more out of 6 consecutive bits within a window.

Figure 5:
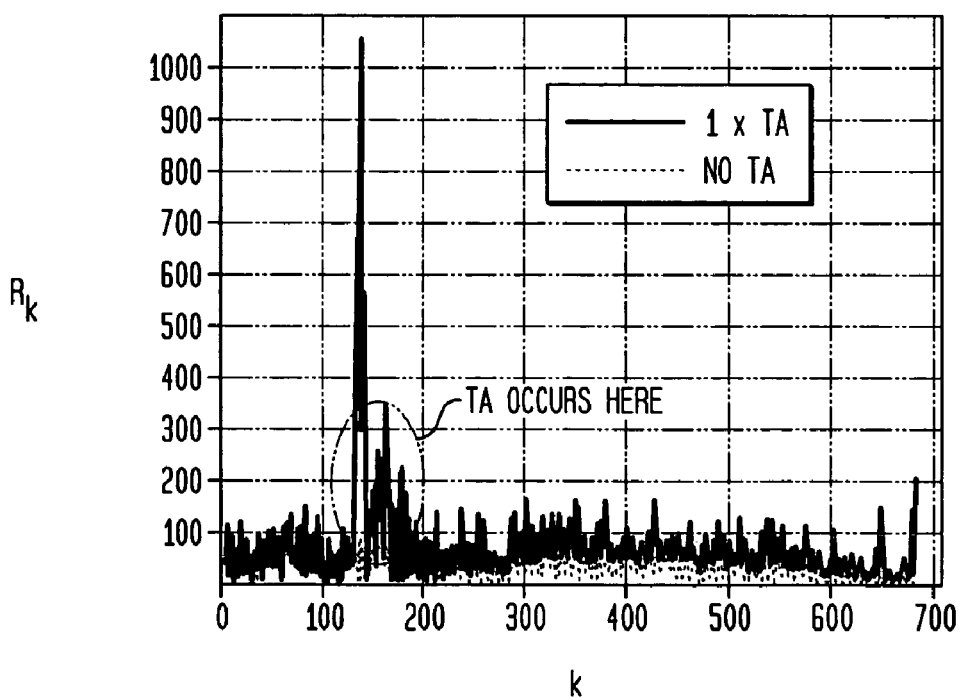
FIG. 5 shows simulated curve traces for the rate of change of the path metric versus bit position for (i) 1x TA, and (ii) no TA.

FIG. 5 shows a simulated curve trace for the rate of change of the ML path metric versus bit position for (i) 1x TA, and (ii) no TA. Where appropriate, TA detector 308 can determine the location, by bit in a sector, of the TA by tracking the bit location associated with the maximum value of $R_k$.

The second embodiment is resistant to the phenomenon of baseline wander, which is well known in the art. This is because the rate of increase of baseline wander is typically smaller than that for a TA, although it is larger than that for a normal, i.e., TA-free, read-back signal. Computer simulations of the second embodiment, with a typical SNR setting, showed it detected each of a million sectors with simulated TAs, and did not detect any false-positive TAs.

Although the present invention has been described in the context of detection of TAs, a person of ordinary skill in the art would understand that it is applicable to any disturbance having similar characteristics, and the description should be read as such.

Although the present invention has been described in the context of systems and/or methods that employ branch metrics and path metrics as state metrics, a person of ordinary skill in the art would understand that variations and alternative methods of tracking the statistics associated with partial-response channels and their decoders are available and equivalent. Furthermore, this invention is not limited to MLSDs using a Viterbi algorithm for disk drives, but is applicable generally to read-channel components that use trellis structures in determining characteristics of an incoming data stream, for example, a maximum a posteriori (MAP) decoding.

The present invention may be implemented as circuit-based processes, including possible implementation as a single integrated circuit (such as an ASIC or an FPGA), a multi-chip module, a single card, or a multi-card circuit pack. As would be apparent to one skilled in the art, various functions of circuit elements may also be implemented as processing steps in a software program. Such software may be employed in, for example, a digital signal processor, microcontroller, or general-purpose computer.

The present invention can be embodied in the form of methods and apparatuses for practicing those methods. The present invention can also be embodied in the form of program code embodied in tangible media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

Unless explicitly stated otherwise, each numerical value and range should be interpreted as being approximate as if the word "about" or "approximately" preceded the value of the value or range.

It will be further understood that various changes in the details, materials, and arrangements of the parts which have been described and illustrated in order to explain the nature of this invention may be made by those skilled in the art without departing from the scope of the invention as expressed in the following claims.

Although the steps in the following method claims, if any, are recited in a particular sequence with corresponding labeling, unless the claim recitations otherwise imply a particular sequence for implementing some or all of those steps, those steps are not necessarily intended to be limited to being implemented in that particular sequence.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

We claim:

1. An apparatus for detecting electrical signal disturbances in a digital read channel, the apparatus comprising a disturbance detector adapted to:
   receive values of a state metric from a sequence detector adapted to receive a signal of the digital read channel; and
   evaluate changes in the state metric values to determine whether an electrical signal disturbance occurred in the digital read channel, wherein:
      the digital read channel is a partial-response read channel; and
      the disturbance detector is adapted to compare a calculated value based on the state metric values to a specified threshold to determine whether the electrical signal disturbance occurred.

2. The apparatus of claim 1, wherein the sequence detector is a maximum likelihood sequence detector that uses a Viterbi algorithm.

3. The apparatus of claim 1, wherein the state metric values received by the disturbance detector are path metric values.

4. The apparatus of claim 1, wherein the state metric values received by the disturbance detector are branch metric values.

5. The apparatus of claim 4, wherein the disturbance detector is adapted to compare, for each window of a plurality of consecutive overlapping windows of a specified length, a rate of increase of branch metric values for said each window to the specified threshold to determine whether the electrical signal disturbance occurred.

6. The apparatus of claim 5, wherein the disturbance detector determines that the electrical signal disturbance has occurred if the rate of increase of branch metric values is greater than the specified threshold for a specified number of consecutive overlapping windows defined by pairs of time instances G time units apart, wherein:
   $R_k$ is the rate of increase of branch metric values for a window defined by time instances k and k+G;
   $R_k = M_{(k+G)}(s_{(k+G)}) - M_k(s_k)$;
   $M_{(k+G)}(s_{(k+G)})$ is a path metric of state $s_{(k+G)}$ at time instance k+G;
   G is the specified window length;
   G is greater than 1; and
   $M_k(s_k)$ is a path metric of the state $s_k$ at time instance k.

7. The apparatus of claim 1, wherein the state metric values are evaluated individually.

8. The apparatus of claim 1, wherein the state metric values are evaluated within multi-sample windows of a specified length.

9. The apparatus of claim 1, wherein the apparatus further comprises the sequence detector.

10. A method for detecting electrical signal disturbances in a digital read channel, the method comprising:
   (a) receiving values of a state metric from a sequence detector adapted to receive a signal of the digital read channel; and
   (b) evaluating changes in the state metric values to determine whether an electrical signal disturbance occurred in the digital read channel, wherein:
      the digital read channel is a partial response read channel; and
      step (b) comprises:
         (1) generating a calculated value based on the state metric values;
         (2) performing a comparison of the calculated value to a specified threshold value; and
         (3) determining if the electrical signal disturbance occurred based on the comparison.

11. The method of claim 10, wherein the sequence detector is a maximum likelihood sequence detector that uses a Viterbi algorithm.

12. The method of claim 10, wherein the state metric values are path metric values.

13. The method of claim 12, wherein the calculated value is the path metric value at the end of a sector of a hard disk drive.

14. The method of claim 10, wherein the state metric values are branch metric values.

15. The method of claim 10, wherein the calculated value is a difference in state metric values at two time instances a specified non-zero time apart.

16. The method of claim 15, wherein a positive determination is made in step (b)(3) if the calculated value is greater than the threshold value for a specified number of consecutive overlapping windows defined by pairs of-time instances.

17. The method of claim 15, wherein a positive determination is made in step (b)(3) if the calculated value is greater than the threshold value for at least a specified proportion of consecutive overlapping windows defined by pairs of time instances.

18. The method of claim 10, wherein the calculated value is a rate of increase of branch metric values for a window of a specified length, where step (b) is performed for a plurality of consecutive overlapping windows.

19. The method of claim 18, wherein a determination that the electrical signal disturbance occurred is made if the rate of increase of branch metric values is greater than the specified threshold for a specified number of consecutive overlapping windows defined by pairs of time instances G time units apart, wherein:

$R_k$ is the rate of increase of branch metric values for a window defined by time instances k and k+G;

$R_k = M_{(k+G)}(s_{(k+G)}) - M_k(s_k)$;

$M_{(k+G)}(s_{(k+G)})$ is a path metric of state $s_{(k+G)}$ at time instance k+G;

G is the specified window length;

G is greater than 1; and $M_k(s_k)$ is a path metric of the state $s_k$ at time instance k.

20. A system for detecting electrical signal disturbances in a digital read channel, the system comprising:

means for generating values of a state metric from a signal of the digital read channel; and means for evaluating changes in the state metric values to determine whether an electrical signal disturbance occurred in the digital read channel, wherein:

the digital read channel is a partial response read channel; and the means for evaluating changes comprises:

means for generating a calculated value based on the state metric values;

means for performing a comparison of the calculated value to a specified threshold value; and means for determining if the electrical signal disturbance occurred based on the comparison.

* * * * *